Jan. 20, 1970　　　D. VANDERLAAN ET AL　　　3,490,404
APPARATUS FOR FORMING BEADS ON CYLINDRICAL CAN BODIES
Filed Aug. 21 1967　　　　　　　　　　　　　　　4 Sheets-Sheet 1
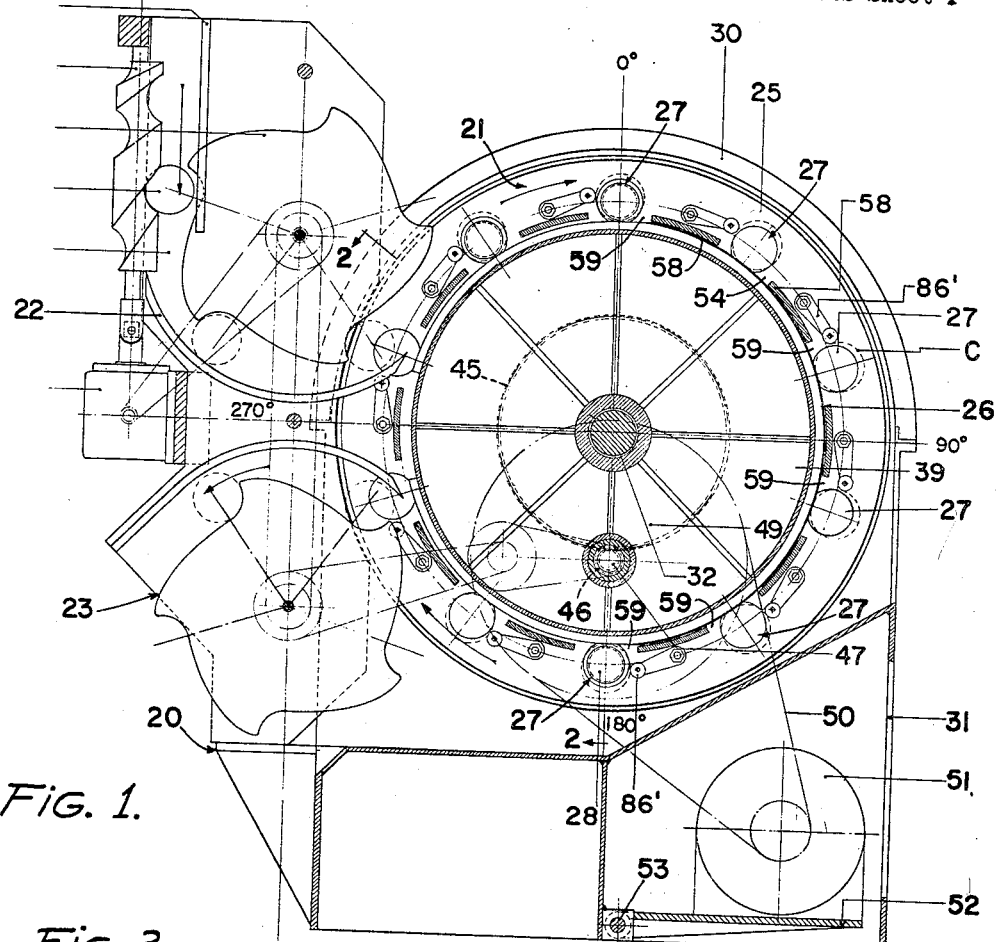
FIG. 1.
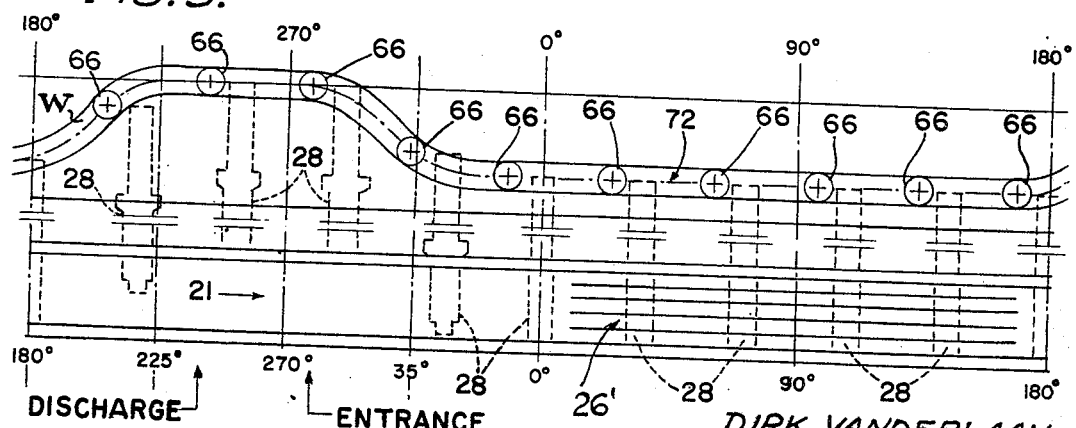
FIG. 3.
FIG. 4.
DIRK VANDERLAAN
JACK DENNEY THOMAS
RICHARD DALE MILLER
INVENTORS:
BY Leslie M. Hansen
THEIR ATTORNEY.

Jan. 20, 1970   D. VANDERLAAN ET AL   3,490,404
APPARATUS FOR FORMING BEADS ON CYLINDRICAL CAN BODIES
Filed Aug. 21 1967                    4 Sheets-Sheet 2
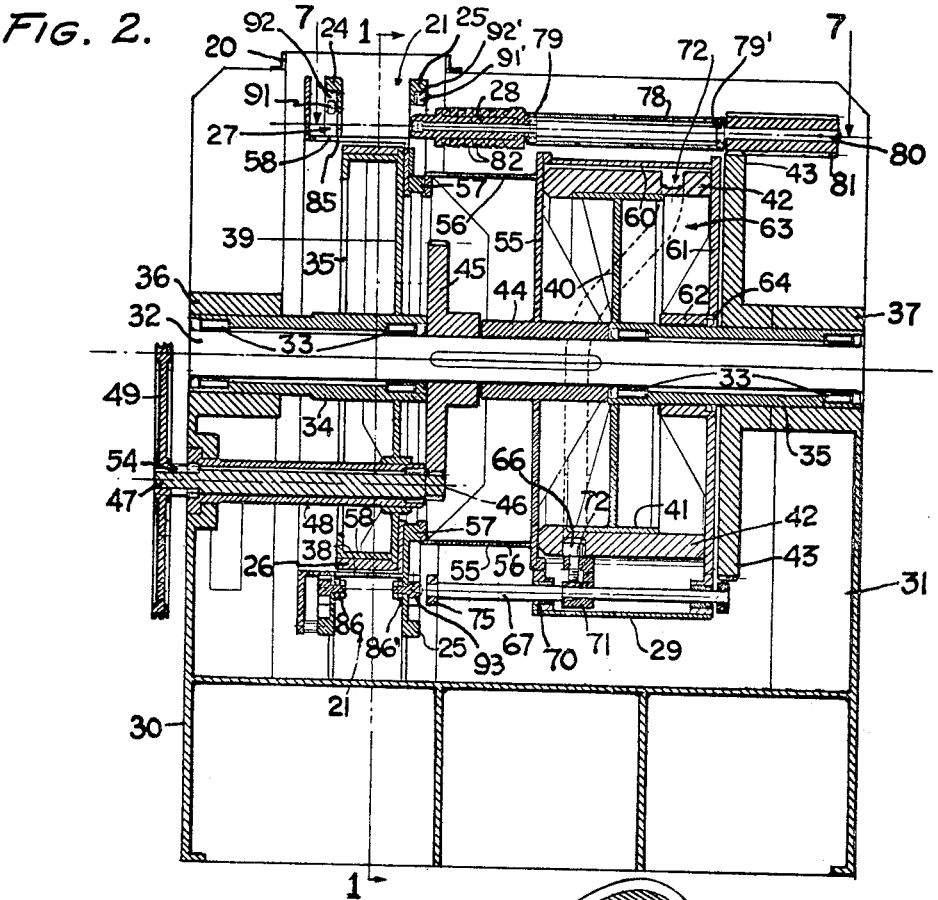
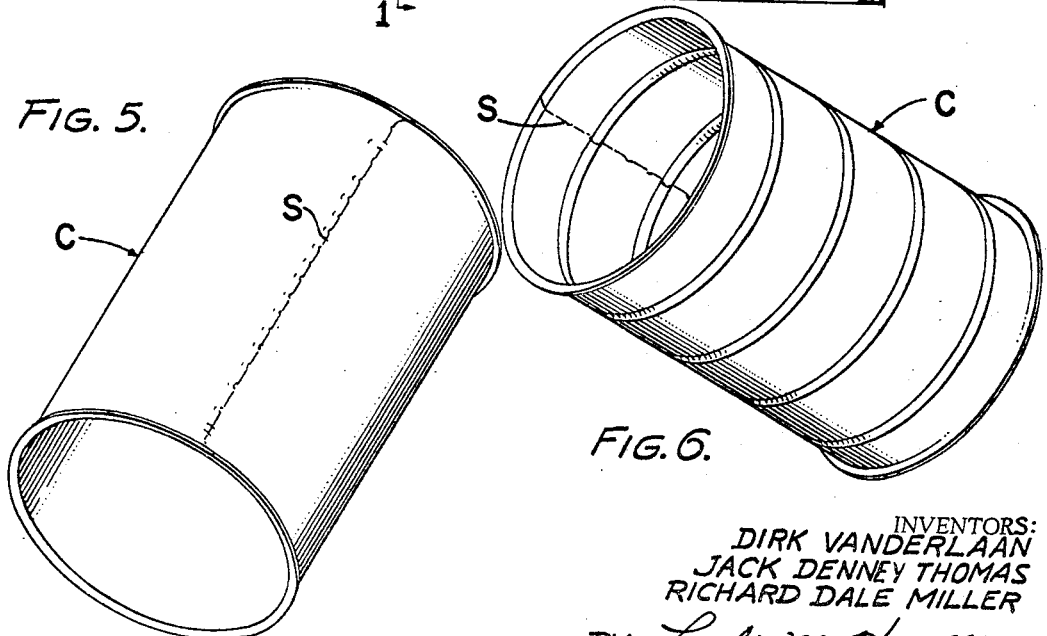
INVENTORS:
DIRK VANDERLAAN
JACK DENNEY THOMAS
RICHARD DALE MILLER
BY Leslie M. Hansen
THEIR ATTORNEY.

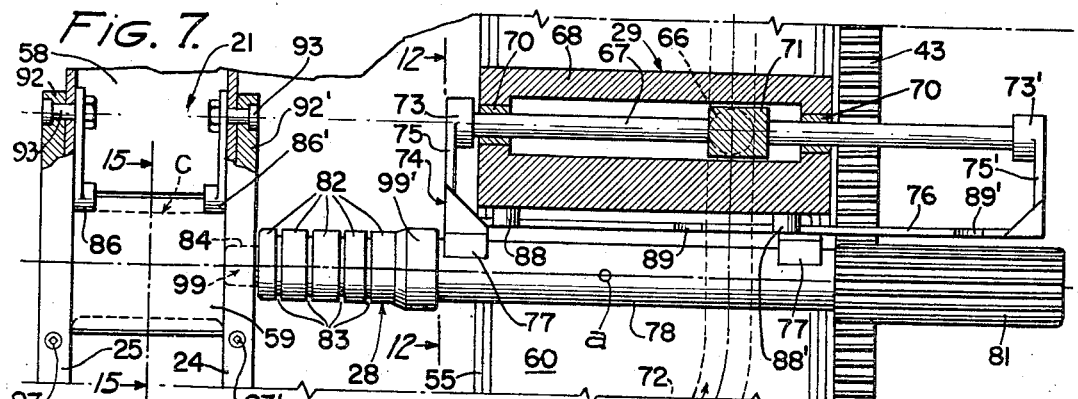
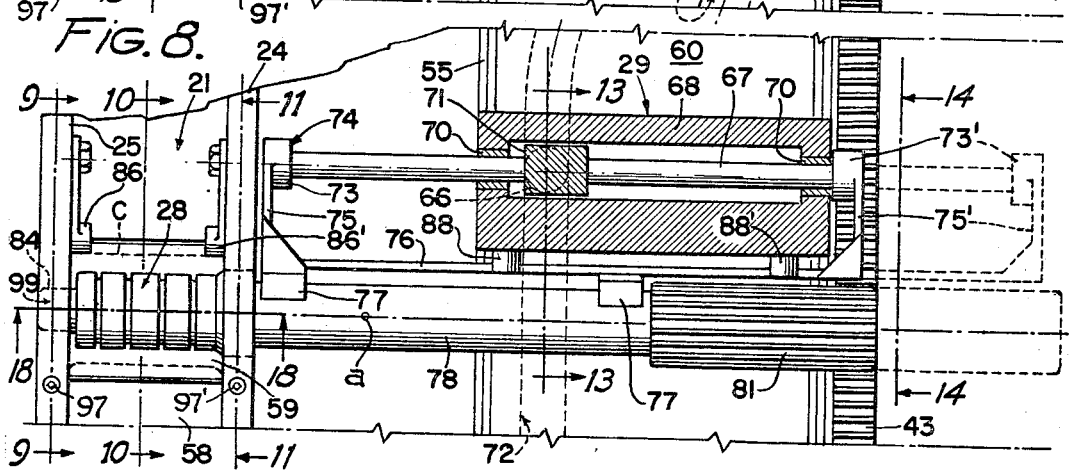
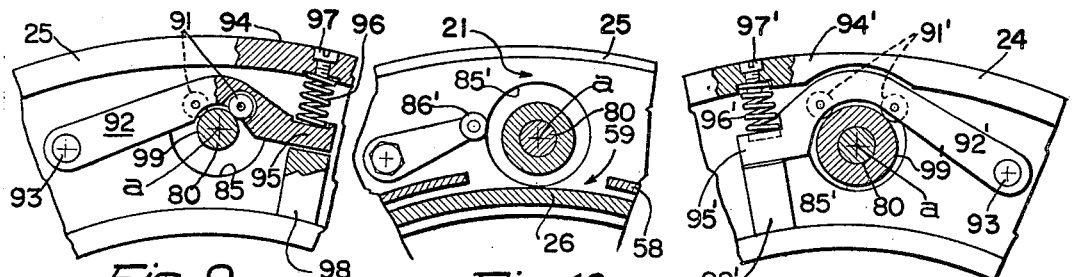
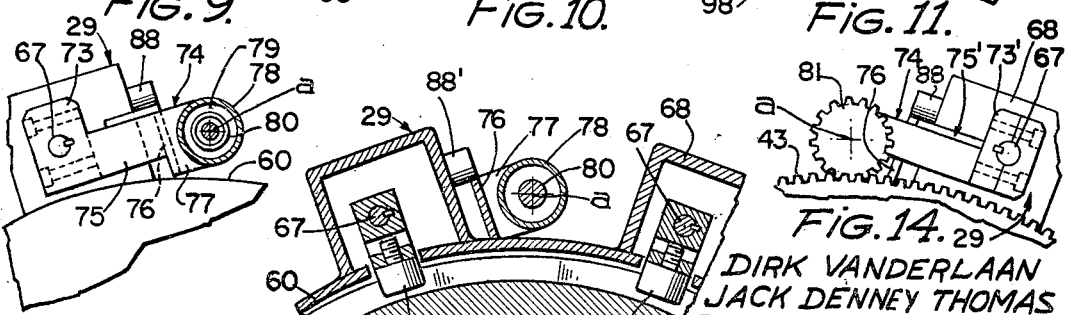

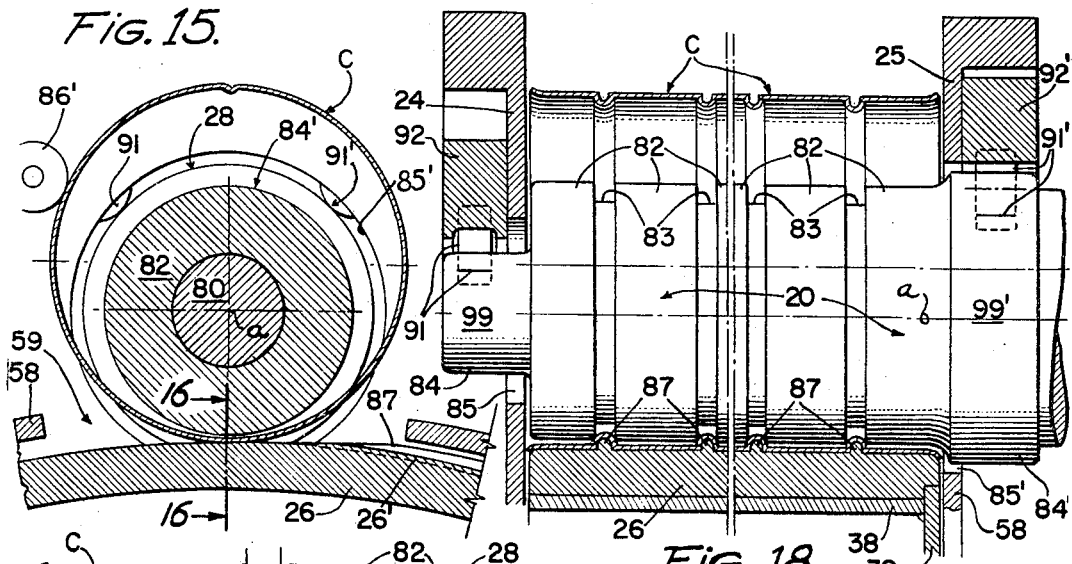
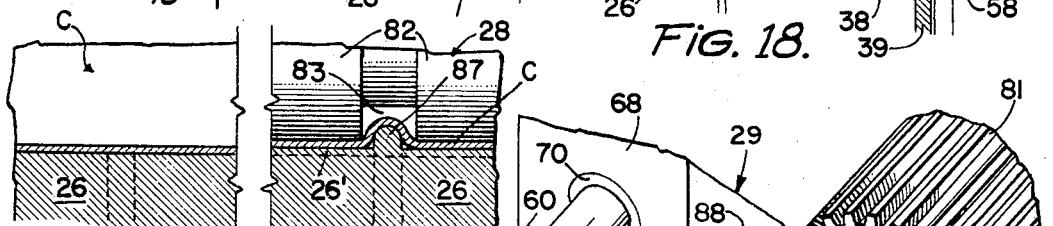
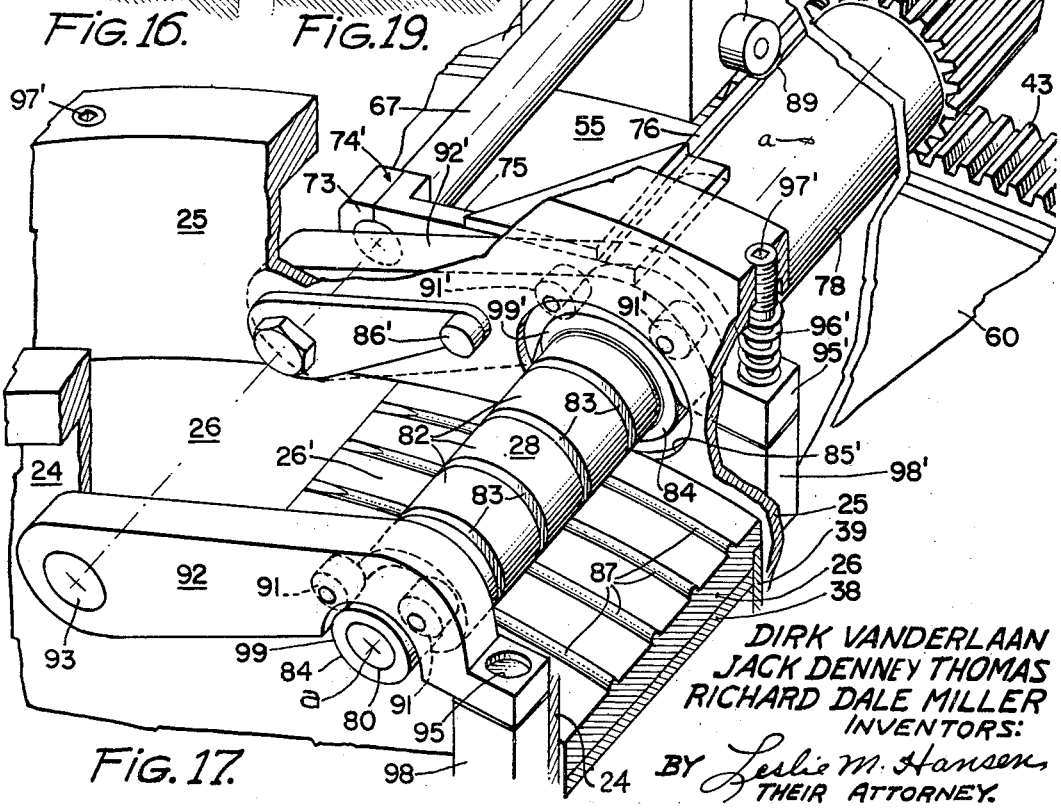

United States Patent Office 3,490,404
Patented Jan. 20, 1970

3,490,404
APPARATUS FOR FORMING BEADS ON CYLINDRICAL CAN BODIES
Dirk Vanderlaan, Alameda, Jack Denney Thomas, Fremont, and Richard Dale Miller, San Jose, Calif., assignors to Miller-Thomas Corporation, doing business as Globe Engineering Company, San Jose, Calif.
Filed Aug. 21, 1967, Ser. No. 662,000
Int. Cl. B21d 19/00
U.S. Cl. 113—115
10 Claims

ABSTRACT OF THE DISCLOSURE

Apparatus in which a plurality of one piece rotary bead forming dies intermittently reciprocate crosswise into and out of a can track between moving side walls thereof for internally engaging cylindrical can forms during their movement over a bead forming rail within the track, and yieldable pressure applying means on the moving side walls of the track for engaging both ends of each of such dies, only during the beading operation, and as close as possible to the can forms for uniformly pressing the latter against the beaded portion of the bead forming rail in the can track.

BACKGROUND

As is well known in the part of fabricating cans the formation of beads at spaced intervals along the side wall of such cans strengthens them against bulging or collapsing. The beads are formed on the cylindrical side wall of the can bodies after they have had flanges formed on their open ends and before the ends, top and or bottom have been attached. The flanges are formed on both ends of the cylindrical can bodies simultaneously in a manner as shown and described in our copending application Ser. No. 611,891 filed on Jan. 26, 1967 in the United States Patent Office which issued on Dec. 31, 1968 as Patent No. 3,418,837.

The beads are formed on the can bodies by pressing the cylindrical wall of a can body between a grooved inside roller and a bead forming rail as the cans roll between the side walls of a path of travel through a bead forming machine.

Heretofore the inside rollers consisted of a pair of half spindles, one at each side wall of the can path, for reciprocation toward and from each other from slide guides outside the can path so as to enter and withdraw from the can body in the can path. Such half spindles are usually aligned axially by a slip fit male and female coupling at their abutting ends. Each reciprocating spindle half had pressure applied to its carrier at a point outside the side walls of the can path. In prior devices such pressure was applied so far away from the can path that misalignment of the inside rollers at their point of union or coupling is unavoidable.

Due to the extreme pressure which must be applied to the inside roller some racking and misalignment of the joined half rollers does occur after wear resulting from usage of the machine. It therefore required periodic adjustment to maintain such prior devices in condition to form beads of uniform depth in the can bodies. It is not uncommon to have to adjust the present type devices as often as every 8 hours which means three shut downs in a peak 24 hour period of operation.

From another viewpoint it should be noted that there is a trend today to use thinner material in the can bodies. It is now common to use what is known as double reduced tin plate which is for example a sheet of tin plate once cold rolled to .008" cold rolled again to reduce its thickness to about .005". This stretches the material into more area enabling the formation of several more can bodies from the same weight of sheet material. This double reduced (twice cold rolled) tin plate results in surface hardening and in the sheet itself becoming more brittle. Consequently it is not only necessary to obtain true alignment of the inside roller dies in order to form grooves of uniform depth, but maximum pressure must be applied to the roller dies to assure against fracturing of the brittle material especially at the flanged ends and seam.

STATEMENT OF INVENTION

With the foregoing in mind it is an object of the present invention to provide in a bead forming apparatus a single unitary internal bead forming presser roller and means on the adjacent sides of the can path for engaging each end of such unitary roller for pressing the latter uniformly toward the beaded rail in such path. In connection with the foregoing it is an object of the present invention to provide dual spring loaded arms for applying pressure at each end of the internal bead forming roller as distinguished from the carrier thereof.

It is another object of this invention to provide a single means for reciprocating such single unitary bead forming pressure rollers into and out of the can path. With this in mind it is contemplated that pressure is applied from a source independent of the bead forming roller or tool and at the can engaging position thereof only, but not during reciprocation of the tool into and out of can engaging position.

It is a further object to rotate the reciprocating unitary bead forming pressure rollers in unison with the can guiding path and to turn the pressure rollers at a speed comparable to that of the can bodies such that the can bodies roll and no relative movement or slippage occurs between the forming rollers, the beaded rail and the can bodies.

It is yet another object to provide a maximum pressure to the unitary presser rollers to effect a uniform depth to the beads formed throughout the can bodies, even at the seams of the latter.

It is still another object to provide the reciprocating means and carrier for such unitary presser rollers with a minimum of moving parts to thereby minimize surface wear. In this connection the present invention contemplates the provision of a device with no set points as would require adjustment. Once the assembly is operative it requires no adjustment or periodic checking.

These and other objects and advantages of the present invention will become apparent from a reading of the following description and claims in the light of the accompanying four sheets of drawings in which:

FIG. 1 is a section through a bead forming apparatus embodying the present invention and taken along line 1—1 in FIG. 2 in the path of can bodies therethrough;

FIG. 2 is a section through the apparatus of FIG. 1 and taken substantially along line 2—2 therein.

FIG. 3 is a flat layout of a cam groove of the apparatus shown in FIG. 2.

FIG. 4 is a flat layout of a beading rail in the bead forming path of FIGS. 1 and 2 to illustrate its relation to the apparatus.

FIG. 5 is a perspective view of a can body about to have beads formed therein;

FIG. 6 is a perspective view of a can body having beads formed therein;

FIG. 7 is a sectional plan view of one bead forming unit of the apparatus of FIGS. 1 and 2 at larger scale and taken substantially along line 7—7 of FIG. 2.

FIG. 8 is a view similar to that of FIG. 7 with the bead forming die thereof extended into the path of can bodies for beading the same.

FIG. 9 is a fragmentary section through one guide rail of FIG. 8 and taken along line 9—9 thereof.

FIG. 10 is a section of FIG. 8 taken at the path of the can bodies and substantially along line 10—10 of FIG. 8.

FIG. 11 is a fragmentary sectional view through the other guide rail of the can forming path and taken along line 11—11 of FIG. 8;

FIG. 12 is a section through FIG. 7 taken along line 12—12 therein;

FIG. 13 is a section through FIG. 8 taken along line 13—13 therein;

FIG. 14 is a side elevational view of FIG. 8 as seen the righthand side and line 14—14 thereof;

FIG. 15 is an enlarged section through a can and the forming station of FIG. 7 as seen along line 15—15 of the latter;

FIG. 16 is an enlarged fragmentary section through FIG. 15 and the can body therein taken along line 16—16 of FIG. 15;

FIG. 17 is a fragmentary perspective view of the bead forming die and rail and associated parts of the invention; partially broken away for purposes of illustration;

FIG. 18 is an enlarged vertical section through FIG. 8 and taken radially of the apparatus along line 18—18 of FIG. 8; and FIG. 19 is an enlarged fragmentary detail of a portion of FIG. 18 and comparable to that of FIG. 16 showing one bead formed in the can body.

GENERAL DESCRIPTION

In general the bead forming apparatus 20 shown in FIGS. 1 and 2 of the drawings includes an annular path 21 and means 22 for feeding can bodies into such path as well as means 23 for receiving and discharging the can bodies therefrom. The annular can body path 21 is formed by guide rings 24–25 spaced at can body length for guiding can bodies around a fixed bead forming rail 26. The guide rings 24 and 25 are provided with a plurality of can supporting and bead forming stations 27 spaced equally from each other segmentally around the annular bead forming rail 26. Each bead forming station 27 has a bead forming pressure roller 28 arranged on a guide and supporting unit 29 for rotation while associated therewith and for reciprocation into and out of the annular path 21 in a position to apply internal pressure to a can body as it rolls around the annular bead forming rail 66. In this manner each can body entering the can path 21 has a plurality of beads or grooves formed in its cylindrical side wall before discharge via the means 23 at the end of the path 21.

DETAILED DESCRIPTION

More specifically the apparatus 20 comprises a frame 30 constructed to provide a cabinet 31 in which a main shaft 32 is journaled for rotation on suitable bearings 33 housed in sleeves 34 and 35. The sleeves 34 and 35 are fixedly secured in bosses 36 and 37, respectively, formed on the side walls of the cabinet 31 adjacent each end of the main shaft 32.

Each of the sleeves 34 and 35 extends inwardly of the cabinet 31 from their respective supporting bosses 36 and 37 as best seen in FIG. 2. The sleeve 34 provides a stationary support for the bead forming rail 26 which is mounted on an annular flange 38 of a disc 39 secured to the sleeve 34.

The sleeve 35 has a disc 40 mounted on its inner end and provided with a peripheral flange 41 to which is secured a stationary cam 42. The sleeve 35 also has a stationary gear 43 mounted thereon adjacent the stationary cam 42. Beyond the internal end of the sleeve 35 (FIG. 2) a hub 44 is mounted on and keyed to the main shaft 32 for rotation therewith. Between the hub 44 and the sleeve 34 a main drive gear 45 is mounted on and keyed to the main shaft 32 for turning the latter.

The main drive gear 45 is in mesh with a pinion gear 46 on the inner end of a main drive pinion shaft 47. This pinion shaft 47 is suitably journaled in a bearing 48 extending from the disc 39 to the adjacent sidewall of the cabinet 31. The pinion shaft 47 extends outside the cabinet 31 and has a pulley 49 mounted thereon and drivingly connected by a belt 50 to the pulley of a drive motor 51. The drive motor 51 is secured to a motor mount 52 pivotally mounted as at 53 to maintain tension on the belt 50 for driving the pinion shaft 47 and the main shaft 32.

As best seen in FIG. 1 suitable belt and pulley drive mechanisms stemming from the pinion shaft 47 at 54 (FIG. 2) serve to turn the star wheels of the means 22 and 23 for feeding the can bodies into and discharging them from the bead forming apparatus 20. Although belt and pulley drive means is shown it will be apparent that chain and sprocket drive means may be employed if desired.

The hub 44 is the main source of rotation for the guide rings 24 and 25 as well as the bead forming pressure rollers 28 and the guide and supporting units 29 therefor. For this reason the hub 44 has a main drive disc 55 secured thereto for rotation therewith. As best seen in FIG. 2 this drive disc 55 carries a flange 56 which extends and is secured to the base 57 of the inner guide ring 25 for turning the latter therewith. A cylindrical guide ring 58 secured to the base 57 as well as the inner and outer guide rings 24 and 25 serves to space them from each other and to turn them in unison about the bead forming rail 26 the peripheral surface of which is spaced slightly inwardly from the cylindrical guide ring 58 (FIG. 10). The guide ring 58 as best seen in FIGS. 1, 7, 8, 10 and 15 has openings 59 formed therethrough in segmental register with each of the bead forming stations 27 in the can body guiding path 21. Thus each can body deposited at each of such stations rests upon the bead forming rail 26.

Again referring to FIG. 2 it will be noted that the main drive disc 55 also has a cylindrical member 60 secured thereto to surround the stationary cam 42. This member 60 is secured to a disc 61 having a hub 62 mounted on the sleeve 35 to form with the member 60 and disc 55 a drum-like enclosure 63 for the cam 42. The hub 62 has a suitable oil seal 64 thereon in relation to the sleeve 35 and fixed cam 42 about which they rotate.

This drum-like enclosure 63 forms an oil sealed housing 65 for a plurality of cam following rollers 66 and the push rods 67 of the respective guide and supporting units 29 for the bead forming pressure rollers 28.

Each guide and supporting unit 29 as seen in FIGS. 7, 8 and 13 has a housing 68 mounted on the cylindrical member 60 and having an opening 69 formed therein parallel to the axis of rotation of the main shaft 32. The push rod 67 of each unit 29 is mounted in sealed bearings 70 at each end of the housing 68 and has a cam roller mount 71 secured thereto. This cam roller mount has the cam following roller 66 secured thereto within the housing 68. The cam following roller 66 is disposed to extend radially inward beyond the perimeter of the cylindrical member 60 and into a groove 72 formed in the fixed cam 42. In this manner the cam following roller 66 and push rod 67 is caused to reciprocate on an axis parallel to but offset radially outward from the axis of the main drive shaft 32.

The push rod 67 of each unit 29 has its ends disposed to extend beyond the sealed bearings 70 at each end of the housing 68 to support the bosses 73 and 73' of a spindle supporting yoke 74. The spindle supporting yoke 74 has a pair of lever arms 75–75' extending from the bosses 73–73' and joined by a bight-like fore flange 76 disposed ahead of the housing 68 in relation to the direction of movement thereof by the drum-like enclosure 63.

The forward face of the fore flange 76 has a pair of pads 77 mounted thereon into which a spindle housing 78 rests and is secured in any suitable manner. This spindle housing 78 is disposed with its axis-*a*- aligned with a respective one of the can supporting and bead forming stations 27 of the annular can body path 21. The spindle housing 78 has a ball bearing 79–79′ at each its ends disposed to support a spindle shaft 80 for free rotation.

That end of the spindle shaft 80 remote from the can body path 21 has an elongated pinion gear 81 secured thereto for meshing relation with the stationary gear 43 which is outside the drum-like enclosure 63. The pinion gear 81 is shiftable lengthwise relative to the fixed gear 43. Consequently, as the drum-like enclosure turns about the stationary cam 42, the pinion gear 81 meshing with the stationary gear 43 is caused to rotate about its axis-*a*- to turn the spindle shaft 80 as it reciprocates by action of the cam follower 66 in the groove 72 of the cam 42.

The opposite end of the spindle shaft 80 has the bead forming pressure roller 28 mounted thereon for turning therewith. Each bead forming pressure roller 28 consists of hardened steel die rings 82 having grooves 83 formed therein at desired locations along their length. The grooved rings 82 are interchangeable with spacer rings therebetween for changing the spacing and location of the grooves as required. Each pressure roller 28 has hardened steel terminal ends 84–84′ spaced from each other a distance comparable to the spacing of the guide rings 24 and 25 from each other so as to register therewith when the pressure roller 28 is in bead forming relation to a can body.

Each pressure roller 28 is normally out of or withdrawn from the can body path during the receipt and discharge phase of rotation about the main drive shaft 32. This is illustrated in FIG. 7 wherein the roller 28 is shown disposed in the space between the inner guide ring 25 and the drum-like enclosure 63. At this stage the groove 72 of the stationary cam 42 is remote from the path 27 of the can bodies. However, as soon as an opening 59 at a bead forming station 27 in the can guide ring 58 passes the can body feeding means 22, the cam groove 72 has an acclivity which urges the cam follower roller 66 of the unit 29 associated with such bead forming station 27 toward the latter. This is best illustrated in the flat lay-out of the cam groove 72 in FIG. 3.

When a can body C enters the bead forming station 27 it rests upon a smooth unbeaded cylindrical segment of the bead forming rail 26 in a plane below the periphery of the particular pressure roller 28 which is about to enter the can body path 27.

The side walls of the guide rings 24 and 25 each have suitable clearance openings 85–85′ formed therethrough to permit the pressure roller 28 to extend across the path of the can body C, internally of such can body. The can body C is supported upon the inclined upper quadrant of the unbeaded portion of the bead forming rail 26 and is pushed along by a pair of pusher rollers 86–86′ mounted on the opposite side walls of the guide rings 24 and 25. As shown in FIG. 15 there is sufficient clearance between the pressure roller 28 and that portion of the can body resting tangently upon the unbeaded portion of the rail 26 to allow the pressure roller 28 to shift into the operative position shown in FIGS. 8 and 17;

Once each bead forming station 27 passes 12 o'clock or zero position FIGS. 1, 15 and 17 there is a slight increment 26′ in the diameter of the bead forming rail 26. In addition to this increment beads 87 are also formed on the rail 26 in register with the grooves 83 in the pressure roller 28 to engage the can body tangently. At this stage the pressure roller 28 immediately engages the inner surface of the can body directly opposite the beads 87, i.e., radially of the path of movement of the can body around the bead forming rail 26. While as appears in FIG. 15, the pressure roller 28 might wedge the periphery of a can body against the beads 87, this is not the case since the pressure roller 28 when within the can track 27 is so mounted as to yield slightly to such sudden thrust as will now be explained.

As best seen in FIGS. 7 through 14 and FIG. 17 the spindle shaft 80 is supported on the bight-like fore flange 76 of the yoke 74, the arms 75–75′ of which are secured to the push rod 67. This provides a slidable mount about the axis of which the yoke 74 is rockable. This rockability of the yoke 74 does not occur other than when the pressure roller 28 is within the can track 27. The rockability is ever so slight and limited within a range determined by the thickness of the tin plate or material from which the can body is formed and the pressure required to form bead grooves in the side wall thereof. The pressure roller, however, is constantly urged in the direction of the beading rail. In other words, as long as the pressure roller 28 is out of operative position with respect to the can track, the yoke 74 is relatively stable, not rockable. At this stage the elongated pinion gear 81 is in bearing relation with the stationary ring gear 43 while the upper edge 76′ of the bight flange 76 of the yoke 74 is held down by a pair of rollers 88–88′ mounted on the fore face of each housing 68 (FIGS. 7, 8, 12–14 and 17). This maintains the reciprocatable spindle housing 78 and spindle shaft 80 with its axis-*a*- in a plane assuring axial entrance and exit of the pressure roller 28 relative to the openings 85–85′ in the side walls of the can track 27. However, when the pressure roller 28 is in operative position within the can track 27, the yoke 74 becomes rockable. This is accomplished by providing a pair of recesses 89–89′ on the upper edge 76′ of the flange 76 where it engages the rollers 88–88′ at fully extended position (FIGS. 8 and 17). This occurs while the cans to be beaded are still resting on the unbeaded portion of the bead rail 26. However, as soon as a can form C with a pressure roller 28 within it rides up onto the beaded portion 26′ and beads 87 of the bead rail 26, the roller 28 and yoke 74 are free to yield to the thickness of the can body. In other words, the bight flange 76 being recessed at 89–89′, the yoke 74 can rock upwardly until the recesses in the flange 76 engage the rollers 88–88′.

Means 90 for uniformly pressing the presser rollers 28 radially inward to press the can forms C against the beads 87 is provided.

As best seen in FIGS. 9, 11, 17 and 18 each terminal end 84 and 84′ of the pressure roller 28 is engaged by a pair of rollers 91–91′, respectively, carried by a pressure arm 92 and 92′. These pressure arms are pivotally mounted as at 93–93′ on the outside of the respective side walls of the guide rails 24 and 25 and below an upper flange 94–94′ thereof which extend outwardly therefrom. The axes of these pivotal mounts 93–93′ are axially aligned with the axis of the push rod 67 about which the spindle shaft 80 is rockably mounted. The opposite end of each pressure arm 92–92′ is provided with a pad 95–95′ having a recessed seat for a compression spring 96–96′. The opposite end of each compression spring 96–96′ is engaged by a threaded stud 97–97′ threaded through a bore formed in the adjacent upper flange 94–94′ as the case may be of the adjacent side wall guide rail 24 and 25. The threaded studs 97–97′ are set to press each spring 96–96′ at uniform pressure against the pads 92–92′, the latter being limited in movement by stop blocks 98–98′ secured to the respective guide rail 24 and 25. Thus it will be seen that despite the thickness of the can body material, the pressure rollers 28 are yieldable sufficiently to accommodate the same.

It should here be noted that the rollers 91–91′ on the respective pressure arms 92 and 92′ are in tangent bearing relation to collets 99 and 99′ on each end of the pressure rollers 28 (FIGS. 9, 11, 17 and 18). These collets 99 and 99′ are disposed as close as possible to the respective ends of the hardened steel die rings 82 of which the presser rollers 28 are formed. The springs 96–96′ being adjustable as to compression by the studs 97–97′ a uniform pressure is applied equally to both ends of the pressure rollers 28. It will thus be appreciated that each end of each presser roller 28 being spring loaded during the can beading operation a uniform yet yieldable pressure is applied to each can form as it receives the impression of the beads 67 on the bead rail 26. In this manner, even though the seam S of a can form may require considerable pressure several, times there will be no rupturing of such seam during the beading operation. Moreover, the spring loading becomes effective only during the time that the bead forming operation occurs.

As soon as the beading operation is completed, which occurs at the end of the beaded portion of the bead rail, namely, 180 degrees beyond the zero station (FIGS. 1, 3 and 4), the guide and supporting unit 29 of the respective pressure roller 28 is caused to withdraw by its cam roller 66 entering the withdrawal acclivity W in the track 72 of the stationary cam 42. The fore flange 76 is thus moved to the right FIGS. 7, 8 and 17 whereby the recesses 89–89' shift from beneath rollers 88–89 which again bear upon the top edge of flange 76. The collets 99–99' are thus moved out from under the rollers 91–91' of the respective pressure arms 92–92'. The springs 96–96' again force the pads 95–95' against the stop blocks 98–98'. No spring load being on the pressure rollers 28 or spindle 80, the yoke 74 now freely reciprocates to and fro under control of the fixed cam 42.

By the time the beaded can reaches the discharge mechanism 23 the pressure rollers 28 have completely withdrawn from the can track 21. The beaded can forms thus discharge consecutively via the discharge means 23.

Having described the improvements in our bead forming apparatus it will be appreciated by those skilled in the art that the same may be susceptible to variations, alterations and/or modifications without departing from the spirit of our invention therein. We therefore desired to avail ourselves of all variations, alterations and/or modifications as may fairly come within the purview of our appended claims.

What we claim as new and desire to protect by Letters Patent is:

1. In a bead forming apparatus of the type having means for successively admitting and discharging can forms into and out of supporting stations on an annular can track between rotating side walls thereof for movement therewith about a fixed rail having a raised bead forming portion provided with spaced beads over which such can forms roll; the combination therewith of:
    (a) a plurality of one piece beading dies;
    (b) a guide and supporting unit for each of said one piece dies adjacent one side wall of said annular can track;
    (c) said side walls of said can track having openings formed therethrough at each can supporting station and in substantially axial alignment with a respective one of said one piece beading dies;
    (d) means operatively connected to the rotating side walls of said can track for rotating said guide and supporting means in unison with the latter and for turning said dies commensurate with the rolling speed of the can forms therein and including means for intermittently reciprocating each of said one piece beading dies into and out of said can track and a can form supported at each can supporting station therein incident to passage of such can form onto and off of the raised bead forming portion of said fixed rail whereby the spaced beads on the raised bead forming portion of said fixed rail elevate each can form into pressing engagement with the beading die within such can form as the latter rollingly engages said spaced beads; and
    (e) yieldable means supported outside each of said side walls for rotation therewith and engageable by both ends of said one piece beading dies during elevation of said can forms by said spaced beads for maintaining such can forms in rolling engagement with the spaced beads on the raised bead forming portion of said fixed rail.

2. The device in accordance with claim 1 in which said means for reciprocating said beading dies comprises:
    (a) a fixed cam having an annular cam track formed therein;
    (b) a drum housing sealingly enclosing said fixed cam and operatively connected to the side walls of said track for rotation therewith, and
    (c) the supporting means for each of said reciprocating beading dies including:
        (1) a cam roller extending into the cam track of said fixed cam,
        (2) a shaft secured to said cam roller and journaled at each end of said drum for reciprocation parallel to and axially offset from the axis of rotation of said drum;
        (3) a yoke having its ends secured to the ends of said shaft and having a bight flange parallel to said shaft;
        (4) a spindle housing secured to the bight flange of said yoke, and
        (5) a rotary spindle mounted in said spindle housing and having one of said beading dies secured to that end thereof adjacent said can track for movement into and out of the same.

3. The device in accordance with claim 2 in which the means for rotating the beading dies comprises:
    (a) a ring gear fixed concentric to and adjacent said drum, and
    (b) a pinion gear secured to said spindle in meshing relation to said ring gear for turning said spindle and beading dies in unison with the rolling movement of the can forms along the bead forming portion of said rail.

4. The apparatus in accordance with claim 2 in which the bead forming portion of said fixed rail comprises
    (a) an increment in diameter of said can track slightly greater than the thickness of the material of the can forms whereby such can forms move radially outward from said fixed rail during rolling movement about the latter and toward the beading die within such can form,
    (b) means on said supporting means for engaging the bight flange of said yoke for maintaining said beading dies a radial distance outwardly from said fixed rail for clearance during reciprocation of said dies into and out of said can track, and
    (c) means for disengaging said means from the bight flange of said yoke upon arrival of said beading dies within said can track whereby the ends of said beading dies engage the yieldable means on each side wall of said can track for applying a uniform pressure load to said beading dies.

5. The apparatus in accordance with claim 4 in which said yieldable means on each of said side walls for applying uniform pressure to the ends of said beading dies comprise;
    (a) a pressure arm pivotally mounted on each of said side walls exteriorly of said can track,
    (b) a pair of rollers mounted on each of said pressure arms for tangently engaging the ends of said beading dies, and
    (c) spring means between each of said side walls and said pressure arms for urging the latter and the pair of rollers thereon toward said beading dies.

6. The apparatus in accordance with claim 5 in which the bead forming portion of said fixed rail comprises:
    (a) an increment in the diameter of said fixed rail, slightly greater than the thickness of the material of the can forms to be beaded, to thereby move such can forms radially outward from said fixed rail and against the uniform pressure applied to the ends of said beading dies by said spring means during rolling movement of said can forms along the beaded portion of said can track.

7. The device in accordance with claim 5 in which said means for reciprocating said beading dies comprises:
   (a) a fixed cam having an annular cam track formed therein;
   (b) a drum housing sealingly enclosing said fixed cam and operatively connected to the side walls of said can track for rotation therewith;
   (c) a cam roller extending into the cam track of said fixed cam,
   (d) a shaft secured to said cam roller and journaled adjacent each end of said drum for reciprocation parallel to and axially offset from the axis of rotation of said drum;
   (e) a yoke having its ends secured to the ends of said shaft and having a bight flange parallel to said shaft;
   (f) a spindle housing secured to the bight flange of said yoke, and
   (g) a rotary spindle mounted in said spindle housing and having one of said beading dies secured to that end thereof adjacent said can track for movement into and out of the same.

8. The apparatus in accordance with claim 7 in which the bead forming portion of said fixed rail comprises:
   (a) an increment in diameter of said can track slightly greater than the thickness of the material of the can forms to thereby lift such can forms outward and toward the beading die within such can form as the latter rolls along said can track,
   (b) means on the bight flange of said yoke for limiting radial movement of said beading dies outwardly from said fixed rail during reciprocation of said dies into and out of said can track,
   (c) means for releasing the bight flange of said yoke from said limiting means upon arrival of said beading dies within said can track and for effecting engagement of the ends of said beading dies with the pair of rollers of the adjacent pressure arm for spring loading said beading dies, and
   (d) means on the side walls of said can track for limiting movement of said pressure arms toward said can track under the influence of said spring means.

9. The apparatus of claim 8 including adjustable means on each of the side walls of said can track for engaging the adjacent ends of said spring means for compressing the latter and balancing the pressure thereof against the respective pressure arms and ends of said beading dies for applying uniform pressure to the latter.

10. The device in accordance with claim 8 in which the limited radial movement of said beading dies comprises a rocking action of said yoke and spindle about the axis of the shaft of said reciprocating means, and in which the pivotal mountings of the pressure arms for said beading dies are disposed in axial alignment with the axis of said shaft.

References Cited

UNITED STATES PATENTS

| | | | |
|---|---|---|---|
| 996,122 | 6/1911 | Osborn | 72—94 |
| 2,407,776 | 9/1946 | Gladfelter et al. | 72—94 |
| 3,089,533 | 5/1963 | Stuchberry et al. | 72—109 |

RICHARD J. HERBERT, Primary Examiner

U.S. Cl. X.R.

72—94